(12) United States Patent
Hiraguchi

(10) Patent No.: US 7,331,541 B2
(45) Date of Patent: Feb. 19, 2008

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 327 days.

(21) Appl. No.: 10/878,524

(22) Filed: Jun. 29, 2004

(65) Prior Publication Data

US 2004/0262439 A1    Dec. 30, 2004

(30) Foreign Application Priority Data

Jun. 30, 2003  (JP) ............................. 2003-187745

(51) Int. Cl.
*G11B 23/107* (2006.01)
(52) U.S. Cl. .................... 242/348.2; 360/132
(58) Field of Classification Search ................ 242/348, 242/348.2; 360/132
See application file for complete search history.

(56) References Cited

U.S. PATENT DOCUMENTS

| | | | |
|---|---|---|---|
| 6,349,892 B2 | 2/2002 | Morita et al. | |
| 6,435,439 B1 * | 8/2002 | Ishihara et al. | 242/348.2 |
| 6,827,307 B2 * | 12/2004 | Hiraguchi et al. | 242/348.2 |
| 6,889,929 B2 * | 5/2005 | Ishihara | 242/348.2 |
| 7,004,418 B2 * | 2/2006 | Hiraguchi et al. | 242/348.2 |
| 7,051,968 B2 * | 5/2006 | Hiraguchi et al. | 242/348.2 |

FOREIGN PATENT DOCUMENTS

| | | |
|---|---|---|
| JP | 11-273304 A | 10/1999 |
| JP | 2000-011591 A | 1/2000 |
| JP | 2000-021127 | 1/2000 |
| JP | 2001-148179 A | 5/2001 |
| JP | 2003-123433 A | 4/2003 |
| JP | 2003-157648 | 5/2003 |

* cited by examiner

*Primary Examiner*—John Q. Nguyen
(74) *Attorney, Agent, or Firm*—Sughrue Mion, PLLC

(57) ABSTRACT

In a recording tape cartridge, an inclined opening obtained by notching a corner portion on the side of loading to a drive apparatus is closed when a door is in a close position in which the door is inclined from a direction matching the loading direction and is open when the door is in an open position along a right side wall. The door is guided by first and second guide grooves and moves between the close position and the open position while changing its orientation by a urging force of a compression coil spring disposed along the right side wall or a moving force transmitted from an operation projection which comes into engagement with the engagement member of the drive apparatus.

16 Claims, 13 Drawing Sheets

F I G. 1
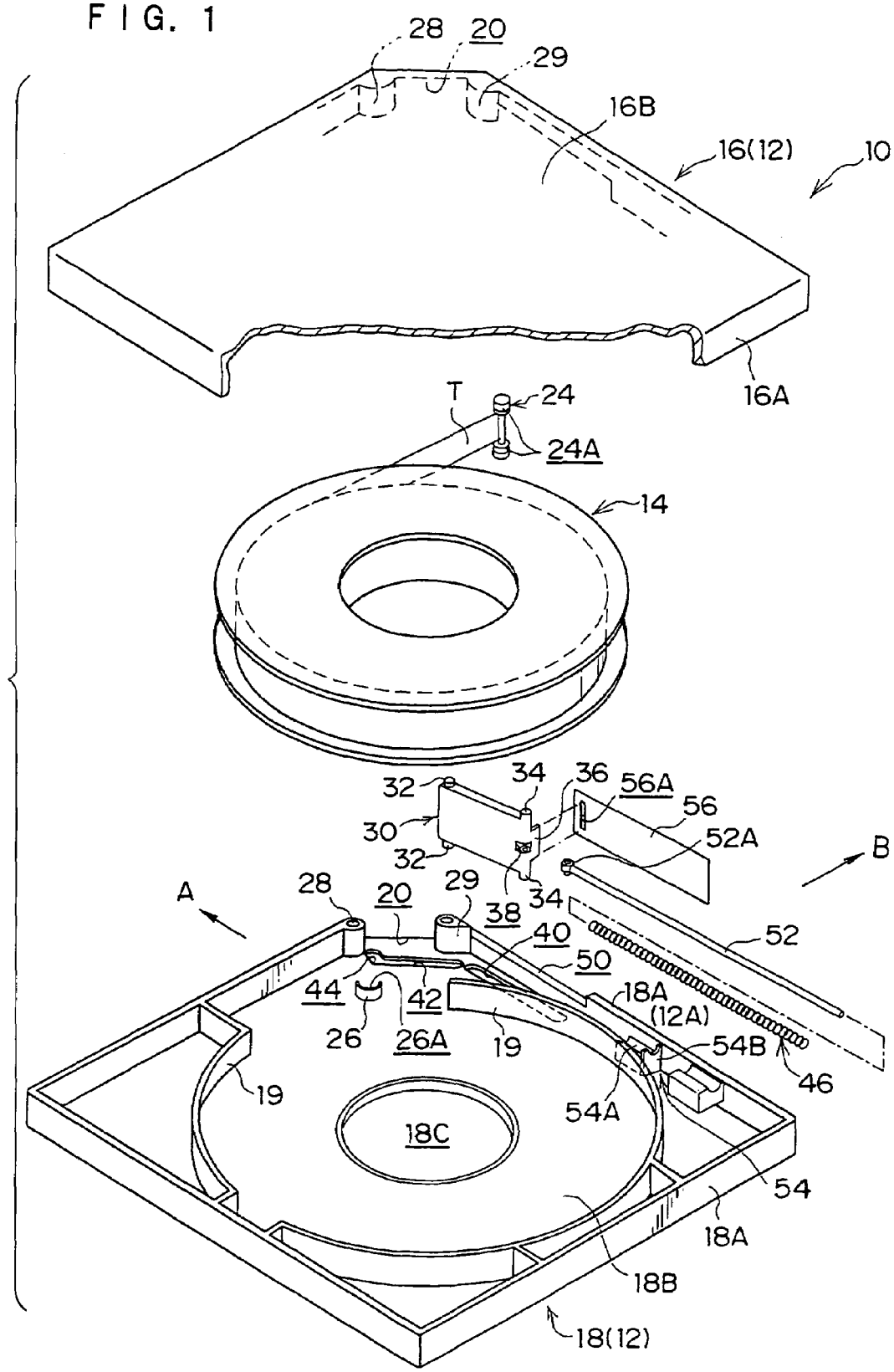

F I G. 3
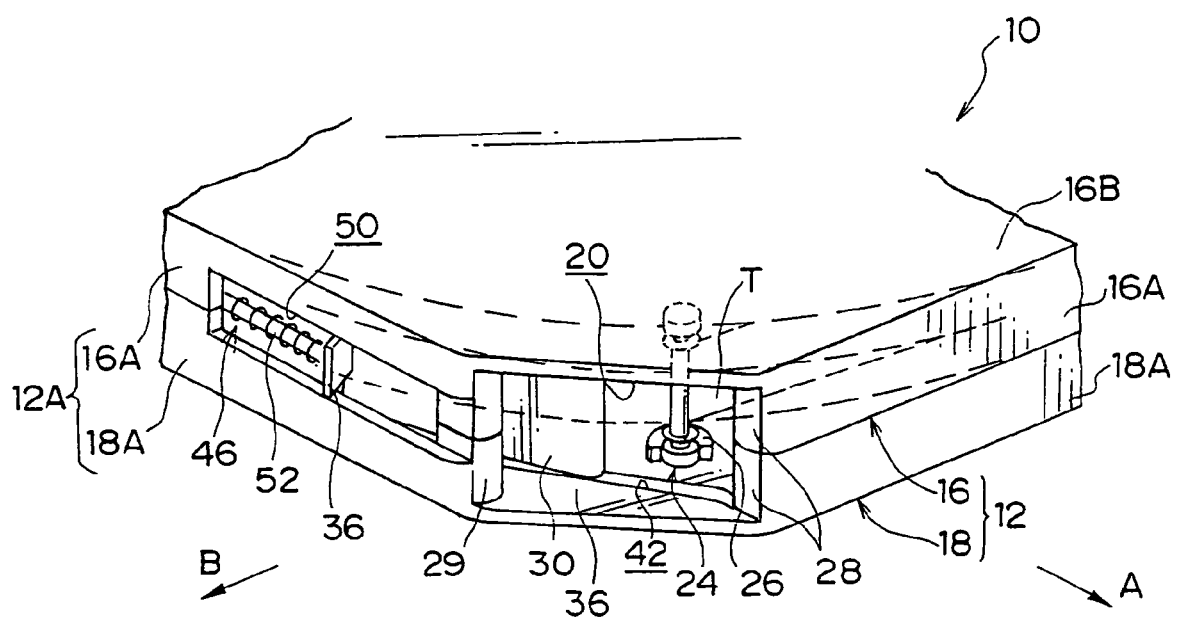

F I G. 7
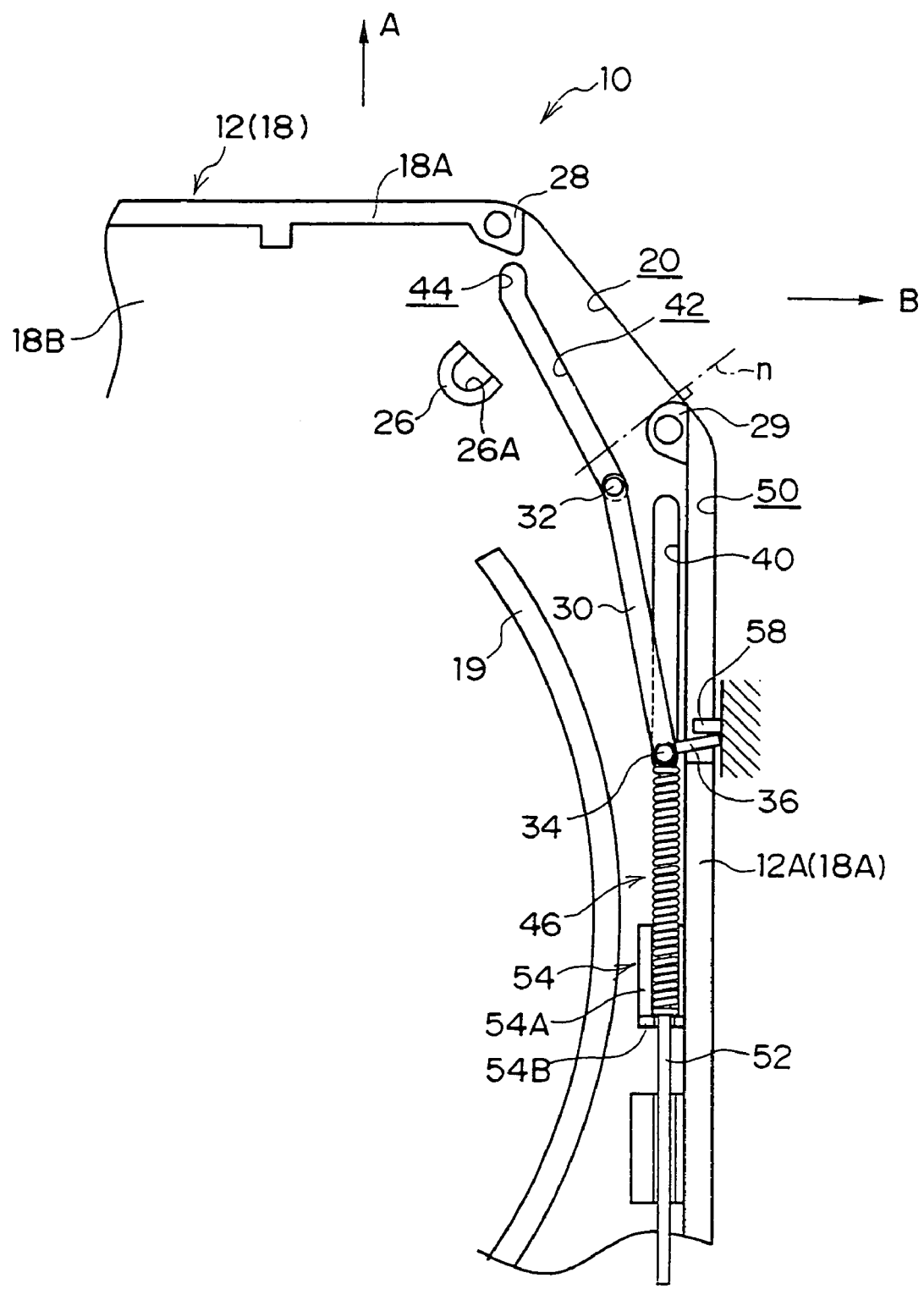

US 7,331,541 B2

RECORDING TAPE CARTRIDGE

CROSS-REFERENCE TO RELATED APPLICATION

This application claims priority under 35 USC 119 from Japanese Patent Application No. 2003-187745 the disclosures of which are incorporated by reference herein.

BACKGROUND OF THE INVENTION

1. Field of the Invention

The present invention relates to a recording tape cartridge in which a single reel around which a recording tape such as a magnetic tape is wound is rotatably accommodated.

2. Description of the Related Art

As an external recording medium of a computer or the like, a recording tape such as a magnetic tape is used. For the recording tape, a recording tape cartridge requiring a small housing space at the time of storage and housing a single reel around which a recording tape capable of recording a large amount of information is wound is employed.

An opening is formed in a case of the recording tape cartridge. From the opening, a recording tape is pulled and is wound around a take-up reel on a drive apparatus side. To prevent dusts and the like from invading from the opening and being adhered onto the recording tape, various devices are made conventionally (refer to, for example, Patent Document 1 (Japanese Patent Application Laid-Open (JP-A) No. 2001-148179), Patent Document 2 (JP-A No. 2000-11591), and Patent Document 3 (JP-A No. 11-273304).

As shown in FIG. 11, in a recording tape cartridge 100 disclosed in Patent Document 1, an opening 104 is formed in a side wall 102A (side wall along the case loading direction A) of a case 102. The opening 104 is closed by a door 106 sliding in the loading direction.

In the position of the opening 104, however, an operation member of the drive apparatus for pulling a leader pin 108 as a leader member attached at an end of a magnetic tape T as the recording tape has to pull the leader pin 108 from a side of the case 102 in wraparound manner. Consequently, a space in which the operation member moves in wraparound manner has to be assured on the drive apparatus, and a mechanism for moving the operation member in wraparound manner is complicated so that the drive apparatus becomes large. From another aspect, the path of pulling the magnetic tape T with respect to a take-up reel 110 is long.

On the other hand, as shown in FIG. 12, in a recording tape cartridge 112 described in Patent Document 2, an opening 116 is formed in a front face wall 114A (front face wall facing in the case loading direction A) of a case 114. The opening 116 is closed by a swing door 118 which swings around a spindle.

In the recording tape cartridge 112, the opening 116 is formed in the front face wall 114A, so that it is unnecessary to move the operation member of the drive apparatus from the side in wraparound manner to pull the magnetic tape T. However, since the door 118 opens largely to the outer side, a space has to be assured on the drive apparatus so as not to disturb the opening operation of the door 118. This increases the size of the drive apparatus.

Further, as shown in FIG. 13, in a recording tape cartridge 120 described in Patent Document 3, a corner portion of a case 122 is notched, thereby forming an opening 124. The opening 124 is directly closed and opened with a leader block 126 as a leader member to which an end of the magnetic tape T is connected.

If the leader block 126 functions only as a door for closing the opening 124, there is no problem even if the leader block 126 is scratched or becomes dirty. However, the leader block 126 is pulled to the operation member and is fit in a hub 130 of a take-up reel 128 on the drive apparatus. Consequently, if the leader block 126 is scratched or becomes dirty, it is feared that the leader block 126 is not fit in the hub 130 well and an adverse influence is exerted on travel of the magnetic tape T. Since the leader block 126 serves as a part of a take-up face around which the magnetic take T is wound, it is feared that data recorded on the magnetic tape T is damaged or an unrecordable region occurs in the magnetic tape T due to the scratch or dirt.

Further, since the leader block 126 is just retained by the periphery of the opening 124, if the case 122 drops, the leader block 126 may come off. In addition, the leader block 126 is larger than a leader pin, so that another constraint is added to the shape of the case 122.

SUMMARY OF THE INVENTION

In consideration of the facts, the present invention is to achieve a recording tape cartridge capable of contributing to smaller size of a drive apparatus while maintaining a function of reliably closing an opening by a shielding member.

A first aspect of the invention is to provide a recording tape cartridge comprising: a substantially rectangular-shaped case in which a single reel around which a recording tape is wound is rotatably accommodated; an opening which is formed by notching a corner, on a front side in a direction of loading the case to a drive apparatus, of the case and from which a leader member attached at an end of the recording tape is pulled out; a shielding member having a flat plate shape, which is provided in the case and can be selectively positioned between a close position in which the shielding member is inclined from the loading direction to close the opening and an open position in which the shielding member is disposed substantially along a side wall parallel to the loading direction in the case to open the opening; a compression coil spring disposed along the side wall and applying an urging force to the shielding member toward the close position; an operation portion provided at the shielding member, which comes into engagement with an engagement member of the drive apparatus by an operation of loading of the case to the drive apparatus, thereby applying a moving force to the shielding member toward the open position; and a guide provided at the case, which guides the shielding member so that the shielding member travels between the close position and the open position while changing orientation thereof by the urging force or the moving force.

In the recording tape cartridge of the first aspect, when a recording tape is unused, the shielding member provided in the case is moved to the close position by the urging force of the compression coil spring and closes the opening. On the other hand, when the recording tape is used, the case is loaded in the drive apparatus. In association with the loading operation, the operation portion of the shielding member comes into engagement with the engagement member of the drive apparatus and the case moves relative to the drive apparatus, thereby acting the moving force to the open position on the shielding member. By the moving force, the shielding member is guided by the guide, while changing the orientation (attitude) from the state where the shielding member is inclined from the loading direction to the state where the shielding member is arranged along the side wall along the loading direction, moved to the open position, thereby opening the opening. From the opening opened in the drive apparatus, a leader member is pulled together with a recording tape.

On the other hand, when the engagement state between the operation portion and the engagement member is canceled, the shielding member is guided by the guide by the urging force of the compression coil spring, while changing its orientation to the direction opposite to that in the case of opening the opening, moved to the close position, thereby closing the opening. Specifically, the guide converts the urging force in the loading direction acting on the shielding member to the force of moving the shielding member while changing the orientation of the shielding member at least when the opening is closed. In such a manner, the shielding member is guided by the guide and moves around outside of the leader member and the reel in the case and closes the opening with reliability.

Since the opening is formed by cutting (notching) the corner on the loading side of the rectangular case, the open face is inclined from the loading direction and faces in the direction of loading the case to the drive apparatus and the direction orthogonal to the loading direction. In other words, pulling means can access the leader member from the loading direction side, the direction side orthogonal to the loading direction, or a corner direction (direction intersecting the above mentioned inclined open face). Consequently, the drive apparatus having the shortest path for pulling the recording tape can be designed and a driving mechanism for moving the pulling means in wraparound manner to chuck the leader member becomes unnecessary, so that the small and low cost drive apparatus can be designed. Since the shielding member moves between the close position and the open position in the case to close/open the opening, the shielding member does not come out from the case in the process of closing/opening the opening. Thus, the housing space of the recording tape cartridge in the drive apparatus is small.

Since the guide for converting the urging force along the loading direction to the force of moving the shielding member while changing the orientation of the shielding member is provided, by arranging the compression coil spring as urging means of a simple structure along (parallel to) the side wall of the case, the function of reliably closing the opening by the shielding member of which orientation is changed in association with the opening/closing of the opening is realized. The compression coil spring disposed along the side wall is effectively laid out (arranged) in a relative small space in the case without overhanging to the housing space of the reel and the like in the case. Further, when the operation portion comes into engagement with the engagement member in association with loading of the case to the drive apparatus, the shielding member moves to the open position. Consequently, it is sufficient that the engagement member can follow the movement in a state where it abuts against the operation portion of the shielding member of which orientation is changed in the process of opening the opening. Thus, the structure of the drive apparatus is simplified.

As described above, in the recording tape cartridge of the first aspect, while maintaining the function of reliably opening/closing the opening by the shielding member, the size of the drive apparatus can be reduced. Further, the shielding member is provided separately from (in addition to) the leader member which is pulled from the case, it is not necessary to be detached from the case. Consequently, the shielding member can be designed so as not to be easily come off from the case by a shock of drop. On the other hand, the leader member is housed in the case of which opening is closed by the shielding member when the recording tape is not used, so that a scratch or damage is suppressed. Therefore, no influence is exerted on pulling or traveling of the recording tape in the drive apparatus, and the recording tape itself is not damaged.

The shielding member in the first aspect is a generic name for members capable of closing an opening, such as a door, a cover, a lid, a shutter, a guard panel, and the like.

A second aspect of the invention is to provide a recording tape cartridge, according to the first aspect, wherein the guide takes form of a cam rail which engages with a guide projection projected from an end portion of the shielding member.

In the recording tape cartridge of the second aspect, the shielding member is guided by the cam rail with which the guide projection projected from the end portion of the shielding member comes into engagement and moves between the close position and the open position by the urging force or moving force. Since the shielding member is guided by the cam rail via the guide projection, the function of reliably closing the opening by the shielding member moving while changing its orientation is realized by a simpler structure (the structure of the guide). The cam rail can be constructed by, for example, a groove, a recess, a hole in which the guide projection is fit (the guide projection is fit by both sides intersecting the moving direction), or a wall along which the guide projection slides only on one side, or the like.

A third aspect of the invention is to provide a recording tape cartridge according to the second aspect, wherein the cam rail is formed so that a travel locus of a portion in the shielding member, on which the urging force of the compression coil spring acts, draws one of a straight line which is almost parallel with the side wall or a circular arc passing a point closest to the side wall.

In the recording tape cartridge of the third aspect, the shielding member moves between the close position and the open position so that the portion of the shielding member, on which the urging force by the compression coil spring acts, draws a straight line which is almost parallel with the side wall of the case (the direction of loading to the drive apparatus) or a circular arc passing a point closest to the side wall. Consequently, the compression coil spring provided along the side wall of the case is not deformed in the direction intersecting the axial direction of the coil spring or the deformation of the coil spring is suppressed. The force in the direction intersecting the loading direction is prevented from being acted on the shielding member. Thus, the operation of the shielding member is stabilized.

A fourth aspect of the invention is to provide a recording tape cartridge, according to any one of the first to third aspects, further comprising a core member which is inserted to the compression coil spring to thereby prevent deformation of the compression coil spring in a direction intersecting an axial line of the compression coil spring.

In the recording tape cartridge of the fourth aspect, the compression coil spring is prevented from being deformed (buckling) in the direction intersecting the axial line by the core member inserted in the axis-shaft portion of the compression coil spring. Thus, the force in the direction intersecting the loading direction can be reliably prevented from acting on the shielding member, and the operation of the shielding member is further stabilized.

A fifth aspect of the invention is to provide a recording tape cartridge according to the fourth aspect, wherein the core member is swingably coupled to a portion in the shielding member, on which the urging force of the compression coil spring acts.

In the recording tape cartridge of the fifth aspect, the core member is coupled to the portion, on which the urging force of the compression coil spring acts, in the shielding member so as to be swingable (angular-variable), so that the angle of the core member is varied with respect to the shielding member of which orientation (position) changes according to opening/closing of the opening, and the state where the core member is disposed along the side wall together with the compression coil spring is maintained. Consequently, the force in the direction intersecting the loading direction is prevented from acting on the shielding member due to deformation of the core member or an interference with the other components, and the operation of the shielding member is further stabilized.

A sixth aspect of the invention is to provide a recording tape cartridge, according to any of the first to fifth aspects, wherein the operation portion is exposed from a window portion provided in the side wall so as to be engaged with the engagement member.

In the recording tape cartridge of the sixth aspect, the operation portion of the shielding member is exposed from the window opened in the side wall of the case. In association with the operation of loading to the drive apparatus, the case moves relative to the drive apparatus while the operation portion comes into engagement with the engagement member, thereby acting the moving force in a direction opposite to the loading direction (along the loading direction) on the shielding member. The moving force is converted to the force of moving the shielding member to the open position while changing the orientation of the shielding member by the guide (the cam rail which comes into engagement with the guide projection), and the shielding member moves to the open position against the urging force of the compression coil spring. As described above, the opening is opened by the movement relative to the drive apparatus of the recording tape cartridge. Consequently, it is sufficient that the engagement member on the drive apparatus is simply fixedly disposed in the position in which the operation portion exposed from the window of the side wall of the case can come into engagement by the loading. Thus, the simple structure is achieved.

A seventh aspect of the invention is to provide a recording tape cartridge, according to the first aspect, wherein the guide comprises a first guide and a second guide, and a first guide projection projected from an one end portion of the shielding member and a second guide projection projected from the other end portion of the shielding member are respectively engaged with the first guide and the second guide.

An eighth aspect of the invention is to provide a recording tape cartridge, according to the seventh aspect, wherein the first guide is arranged in the case such that the first guide is along the side wall parallel to the loading direction, and the second guide is arranged in the case such that a longitudinal direction of the second guide is inclined with resect to the loading direction.

A ninth aspect of the invention is to provide a recording tape cartridge, according to the seventh aspect, wherein the second guide has a bent portion at a front side in the loading direction thereof.

A tenth aspect of the invention is to provide a recording tape cartridge, according to any of the first aspect, wherein the guide has a substantially circular arc configuration which is curved outward of the case.

An eleventh aspect of the invention is to provide a recording tape cartridge, according to any of the tenth aspect, wherein a first guide projection projected from an one end portion of the shielding member and a second guide projection projected from the other end portion of the shielding member are engaged with the guide.

A twelfth aspect of the invention is to provide a recording tape cartridge, according to the tenth aspect, wherein the guide has a bent portion at a front side in the loading direction thereof.

A thirteenth aspect of the invention is to provide a recording tape cartridge, according to the twelfth aspect, wherein a rear end portion of the second guide is disposed at inner side of the case with respect to a front end portion of the first guide.

In the recording tape cartridge of any on of the seventh to twelfth aspects, similar to the first aspect, while maintaining the function of reliably opening/closing the opening by the shielding member, the size of the drive apparatus can be reduced.

BRIEF DESCRIPTION OF THE DRAWINGS

An example of an embodiment of the invention will be described in detail below with reference to the following drawings, wherein;

FIG. 1 is an exploded perspective view showing a general configuration of a recording tape cartridge according to an embodiment of the present invention;

FIG. 3 is a perspective view showing a state where the opening in the recording tape cartridge according to the embodiment of the invention is half open or close;

FIG. 7 is a plan view showing, with the upper-half case removed, a state where the opening in the recording tape cartridge according to the embodiment of the invention is open;

FIG. 8A shows a state where the opening is closed, FIG. 8B shows a state where the opening is half open or close, and FIG. 8C shows a state where the opening is open;

DETAILED DESCRIPTION OF THE INVENTION

Figure 2:
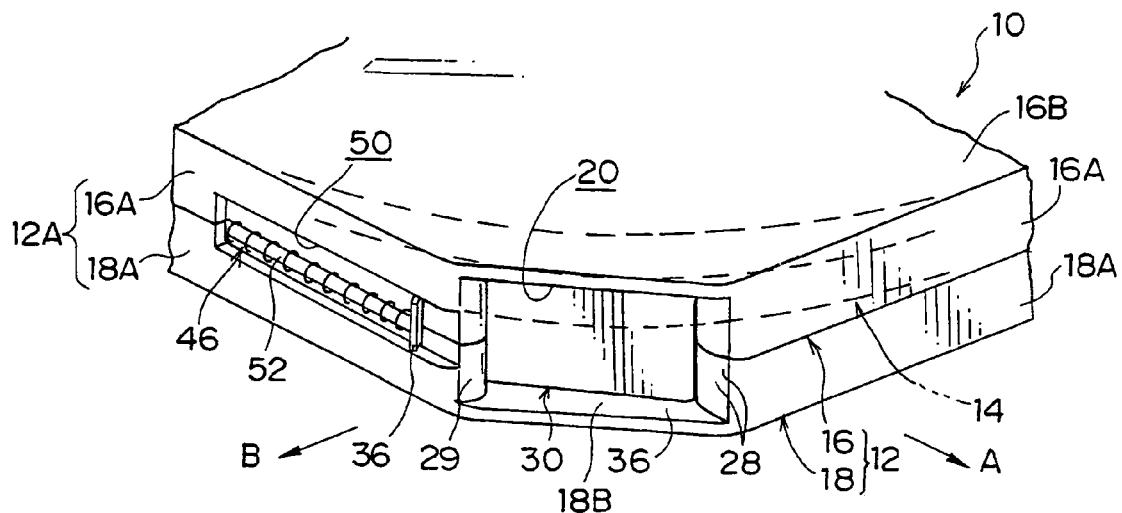
FIG. 2 is a perspective view showing a state where an opening in the recording tape cartridge according to the embodiment of the invention is closed by a door.

A recording tape cartridge 10 according to an embodiment of the present invention will be described with reference to FIG. 1 to FIGS. 8A, 8B, and 8C. First, a schematic general configuration of the recording tape cartridge 10 will be described and then an opening 20 and a door 30 as a shielding member for closing the opening 20 as main components of the invention will now be described. For convenience of explanation, the loading direction of the recording tape cartridge 10 to a drive apparatus shown by the arrow A will be referred to as the front direction (front side) of the recording tape cartridge 10, and the direction of the arrow B orthogonal to the arrow A will be referred to as the right direction.

General Configuration of Recording Tape Cartridge

As shown by a schematic exploded perspective view of FIG. 1, the recording tape cartridge 10 is constructed so that a single reel 14 around which the magnetic tape T as a recording tape which is an information recording/reproducing medium is wound is rotatably housed in a case 12 having an almost rectangular shape in plan view.

The case 12 is constructed by but-joining peripheral walls 16A and 18A of a pair of an upper-half case 16 and a lower-half case 18 each having a notched right front corner as one of corners on the head side in the direction of loading to the drive apparatus. The case 12 has therein a space for housing the reel 14 around which the magnetic tape T is wound. The opening 20 for pulling the magnetic tape T is formed by the notched corner portions of the peripheral walls 16A and 18A of the upper-half and lower-half cases 16 and 18 together with a top plate 16B and a bottom plate 18B.

To a free end of the magnetic tape T pulled from the opening 20, a leader pin 24 which is pulled while being retained by (engaged with) a chucking mechanism 22 (refer to FIG. 4) of the drive apparatus is connected. An annular groove 24A is formed at each of both ends projected from ends in the width direction of the magnetic tape T in the leader pin 24 and is retained by a hook 22A of the chucking mechanism 22. With the configuration, at the time of pulling the magnetic tape T, the hook 22A does not come into contact with the magnetic tape T and no damage occurs.

On the inside of the opening 20 of the case 12, a pair of upper-half and lower-half pin stands 26 for positioning and holding the leader pin 24 in the case 12 are provided (the pin stand on the upper-half case 16 side is not shown). The pin stand 26 has a semi-cylindrical shape, and both ends of the leader pin 24 in an upright state are held in recesses 26A in the pin stands 26. The side of pulling the magnetic tape T of the peripheral wall of the pin stand 26 is open and serves as an entrance of the leader pin 24.

In the center portion of the bottom plate 18B of the lower-half case 18, a gear opening 18C for exposing a not-shown reel gear of the reel 14 to the outside is provided. The reel gear engages with a drive gear of the drive apparatus to rotate the reel 14 in the case 12. The reel 14 is held so as not to rattle by play restricting walls 19 partially projected from the inner faces of the upper-half case 16 and the lower-half case 18 and existing on a circular locus which is coaxial with the gear opening 18C.

Configuration of Opening and Case Near the Opening

Figure 4:
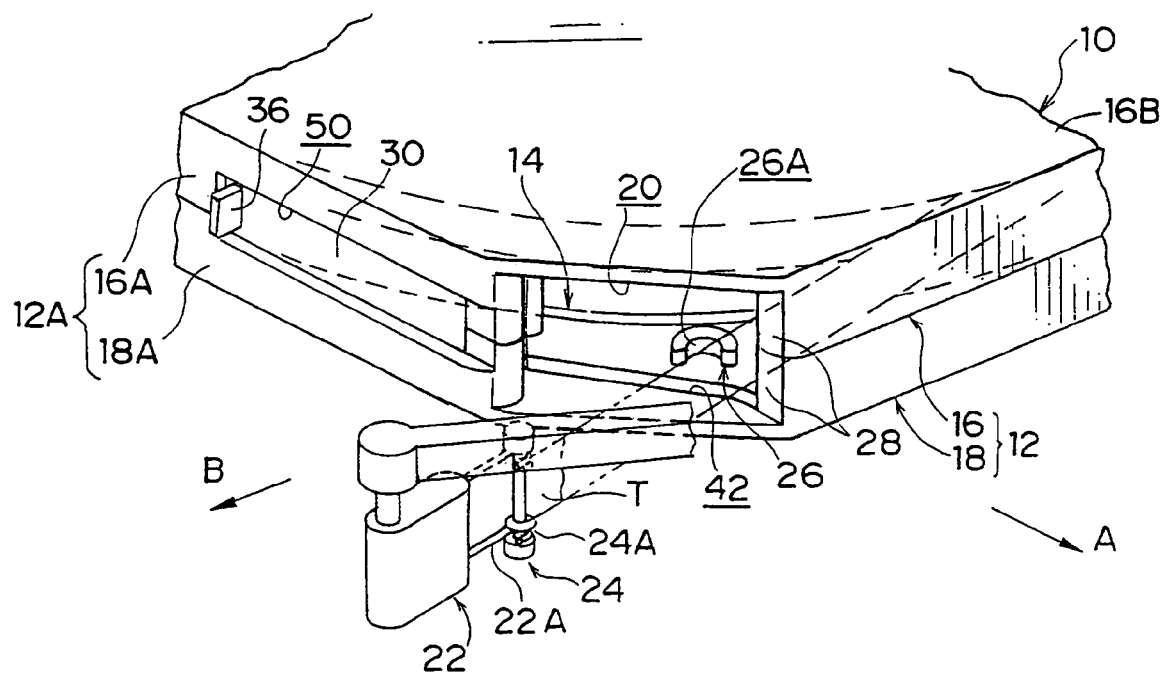
FIG. 4 is a perspective view showing a state where the opening in the recording tape cartridge according to the embodiment of the invention is open.

As shown in FIGS. 2 to 4, the opening 20 is formed by notching the corner on the side of loading to the drive apparatus of the case 12 as described above. Since the open surface is oriented in the direction of the arrow A and in the direction of arrow B (inclined from the direction of the arrow A), the chucking mechanism 22 of the drive apparatus can access from the direction of the arrow A, the arrow B or between the arrows A and B to chuck the leader pin 24.

With the configuration, an area in which the pin stand 26 for holding the leader pin 24 can be installed is widened. Specifically, since the area in which the chucking mechanism 22 of the drive apparatus can chuck the leader pin 24 is wide, the position of mounting the pin stand 26 can be set in accordance with the specifications of the drive apparatus for chucking the leader pin 24 from the direction of the arrow A or B. Consequently, the flexibility of designing of the drive apparatus also increases.

In the front and rear edges of the opening 20, that is, in the terminating ends of the notched peripheral walls 16A and 18A of the upper-half and lower-half cases 16 and 18, screw bosses 28 and 29 are formed. To the screw bosses 28 and 29, not-shown screws are screwed from the down side, thereby fixing (joining) the upper-half case 16 and the lower-half case 18.

The strength of the corners at both ends of the opening 20 which are specified by the free ends of the peripheral walls 16A and 18A, the corners being disadvantageous from a viewpoint of strength and having tendency to crash on the ground at the time of a drop, therefore improves. Even if the case 12 is dropped, the case 12 is not deformed due to the whole weight of the recording tape cartridge 10 and is not buckled or position-deviated.

In the embodiment, as an example, the diameter of the screw thread of the screw is $\phi 2.0$ mm and the outside diameter of the screw bosses 28 and 29 is $\phi 4.0$ mm. It is also possible to provide projections projected from the upper-half case 16 in the positions corresponding to the screw bosses 28 and 29 and engagement holes which come into engagement with the projections in the lower-half case 18, and make the projections and the engagement holes engage each other. In this case, it is desirable to screw the upper-half case 16 and the lower-half case 18 in positions within the radius of 30 mm or less of the engagement portion. Further, butting faces of the peripheral walls 16A and 18A (the corner portions on both sides of the opening 20) may be welded to each other.

In the area where the pin stand 26 is disposed (near the opening 20), the plate thickness of each of the upper-half case 16 and the lower-half case 18 is 2 mm. The area is thicker than the other area (not shown). Further, the case 12 (the upper-half case 16 and the lower-half case 18) is made of a polycarbonate material (PC). The thickness in the bottom portion of each of a first guide groove 40 and a second guide groove 42 which will be described later in the case 12 is 0.5 mm to 1 mm. The arrangement is to increase the strength of the portion around the pin stand 26 as the holding (positioning) position of the leader pin 24 which is the most important (to be accurately retained by the chucking mechanism 22 at the time of pulling the magnetic tape T) from a viewpoint of the function of the recording tape cartridge 10, thereby preventing occurrence of a positional deviation by a shock of a drop or the like.

The inclination angle from the arrow A direction of the open face of the opening 20 is determined according to a demand of identification (recognition) of the recording tape cartridge 10 in a library apparatus. The library apparatus is used to house a plurality of recording tape cartridges 10 and to automatically load/eject a recording tape cartridge 10 to/from the drive apparatus (without needing manpower). In the case where plural kinds of the recording tape cartridges 10 and plural kinds of the drive apparatuses exist, it is necessary to recognize the generation, recording capacity, and the like of each of the recording tape cartridges 10. For the recognition, the inclination angle of the open face of the opening 20 can be used.

As described above, the opening 20 for pulling the magnetic tape T formed in consideration of the strength as described above also serves as the recognition section in the library apparatus by the inclination angle of the open face (concretely, the inclination angle of the top plate 16B or bottom plate 18B specifying the top or bottom of the opening 20). Consequently, insufficient strength of the case 12, deterioration in dust proof, and complication of the mold structure which are concerned in the case where the opening 20 and the recognition section are provided separately (for example, in the case where one or plural through holes are formed in the case 12 as recognition sections) can be prevented.

The case 12 also has a slit 50 as a window formed in a right-side wall 12A (side wall in the arrow A direction constructed by the peripheral walls 16A and 18A on the right side) continued to the screw boss 29 specifying the rear periphery of the opening 20.

The slit 50 is formed by cutting a lower portion of the peripheral wall 16A and an upper portion of the peripheral wall 18A constructing the right-side wall 12A, positioned in the center portion in the vertical direction of the right-side wall 12A, and is formed in a rectangular shape which is long in the front/rear direction. The slit 50 is also open forward since the center portion in the vertical direction of the right-side wall 12A is cut to the right side of the screw boss 29 (refer to FIGS. 2 to 4). The slit 50 is formed for exposing an operation projection 36 of the door 30 which will be described later.

The case 12 also has the first and second guide grooves 40 and 42 for guiding the door 30 to be described later and a spring bearing 54 by which an end of a compression coil spring 46 to be described later is retained. Those components will be described later together with the door 30.

Configuration of Door

The opening 20 described above is closed by the door 30 as a shielding member provided in the case 12. The door 30 is formed in a rectangular flat plate shape and can close the opening 20 from the inside of the case 12.

The door 30 has guide pins 32 projected from upper and lower end faces (in the width direction) at one end in the longitudinal direction and guide pins 34 projected from upper and lower end faces at the other end in the longitudinal direction. The door 30 also has a notch 38 provided in an intermediate portion in the vertical direction at the other end, that is, on the guide pin 34 side and penetrating in the thickness direction, and the operation projection 36 projected from the other end to the outside in the thickness direction so as to cross the notch 38.

The door 30 can move between a close position for closing the opening 20 and an open position for opening the opening 20 while being guided by the first and second guide grooves 40 and 42 as a guide section or cam rails formed in the case 12.

Figure 5:
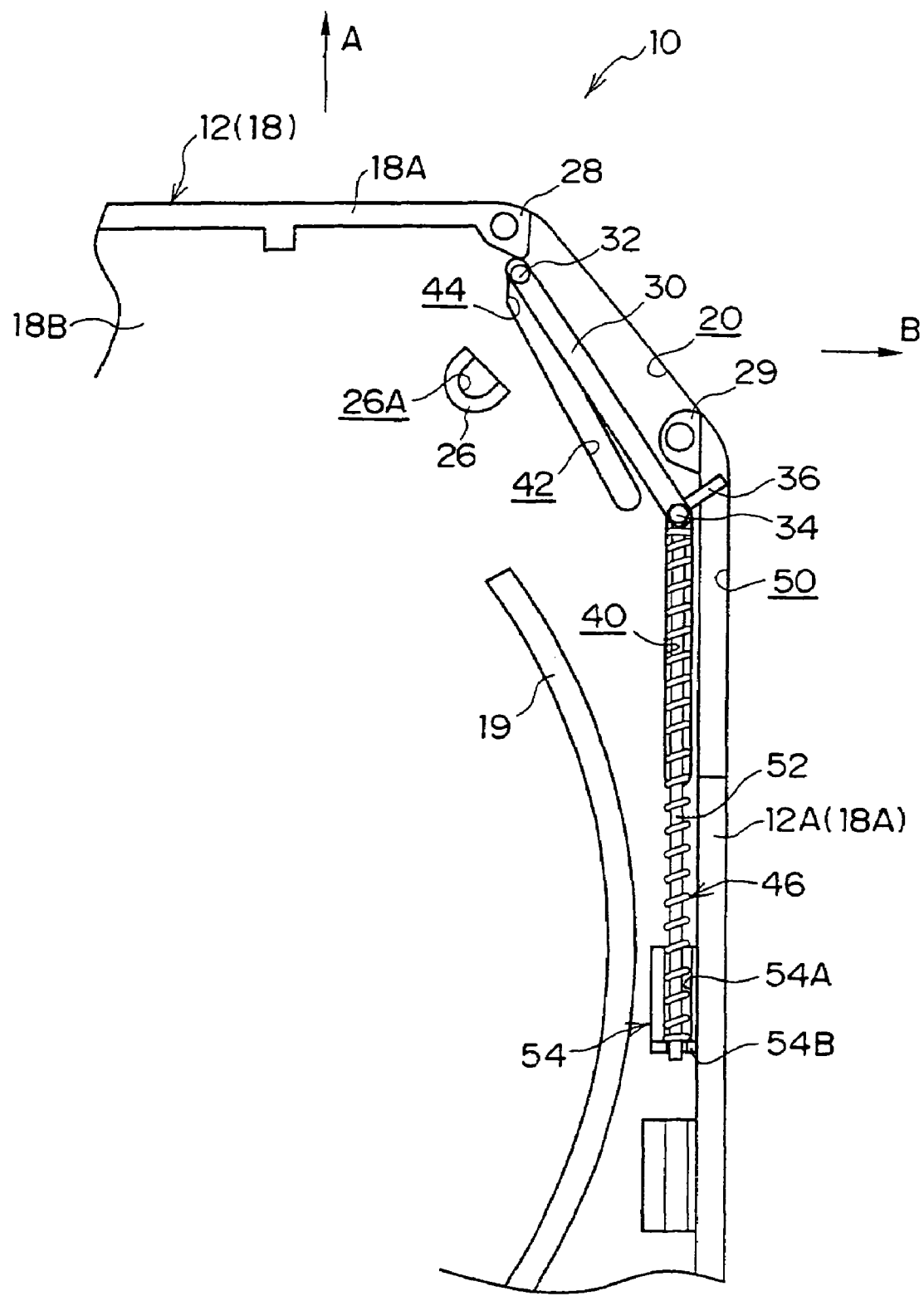
FIG. 5 is a plan view showing, with an upper-half case removed, a state where the opening in the recording tape cartridge according to the embodiment of the invention is closed by a door.
Figure 6:
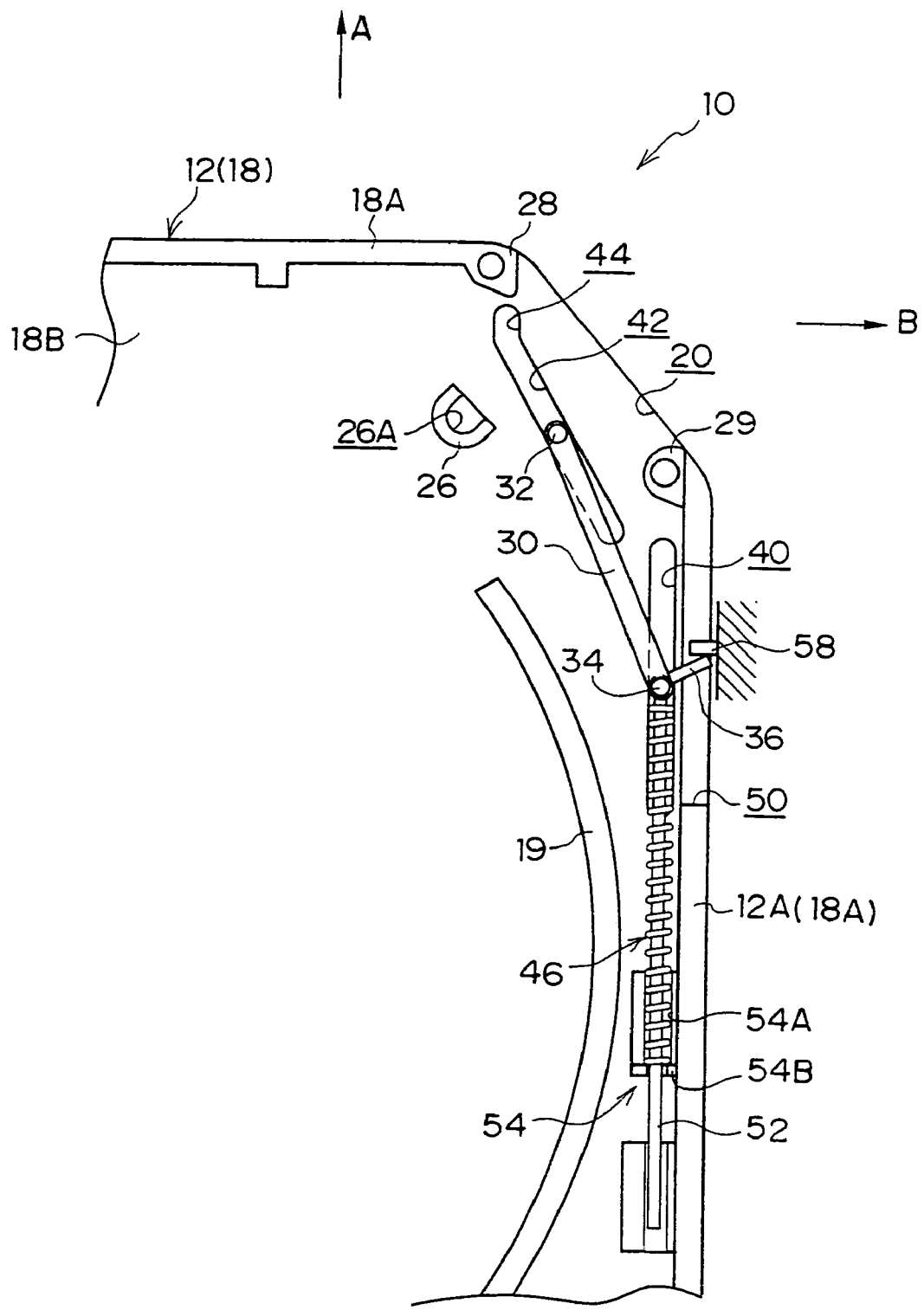
FIG. 6 is a plan view showing, with the upper-half case removed, a state where the opening in the recording tape cartridge according to the embodiment of the invention is half open or close.

Concretely, as shown in FIGS. 5 to 7, near the right side wall 12A in the top plate 16B and the bottom plate 18B of the case 12, the pair of upper and lower first guide grooves 40 facing each other are provided in the arrow A direction.

Each of the first guide grooves 40 is formed so that its base end is positioned slightly rearward of the screw boss 29 and its length is slightly shorter than the plate (longitudinal) length of the door 30. The guide pins 34 of the door 30 are inserted in the upper and lower first guide grooves 40. The upper and lower first grooves 40 guide the guide pins 34 in the longitudinal direction.

On the other hand, between the open face of the opening 20 in the top plate 16B and the bottom plate 18B of the case 12 and the pin stand 26, the pair of upper and lower second guide grooves 42 inclined by a predetermined angle from the arrow A direction and facing each other are provided. The base end and the terminating end of the second guide groove 42 are positioned near the front and rear screw bosses 28 and 29, respectively, and the length of the second guide grooves 42 is slightly shorter than the plate length of the door 30. The guide pins 32 of the door 30 are inserted in the upper and lower second guide grooves 42, and the upper and lower second guide grooves 42 guide the guide pins 32 along their longitudinal direction.

Figure 8A:
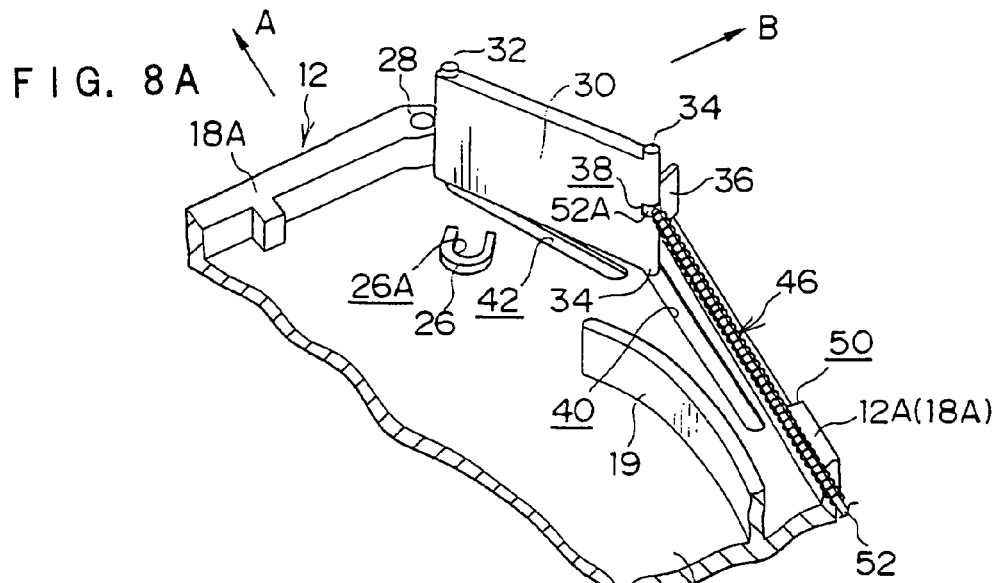
FIGS. 8A, 8B, and 8C are perspective views showing, with the upper-half case removed, a process of opening the opening in the recording tape cartridge according to the embodiment of the invention.

In the configuration, the door 30 is positioned in the close position at which an end of the door abuts against the screw boss 28 and the other end comes into contact with the right side wall 12A near the screw boss 29 in a state where the guide pins 32 are positioned at the front end of the second guide grooves 42 and the guide pins 34 are positioned at the front end of the first guide grooves 40, thereby closing the opening 20 from the inside (refer to FIGS. 5 and 8A). In short, the (longitudinal direction of) door 30 is inclined from the arrow A direction when it is in the close position.

Figure 8B:
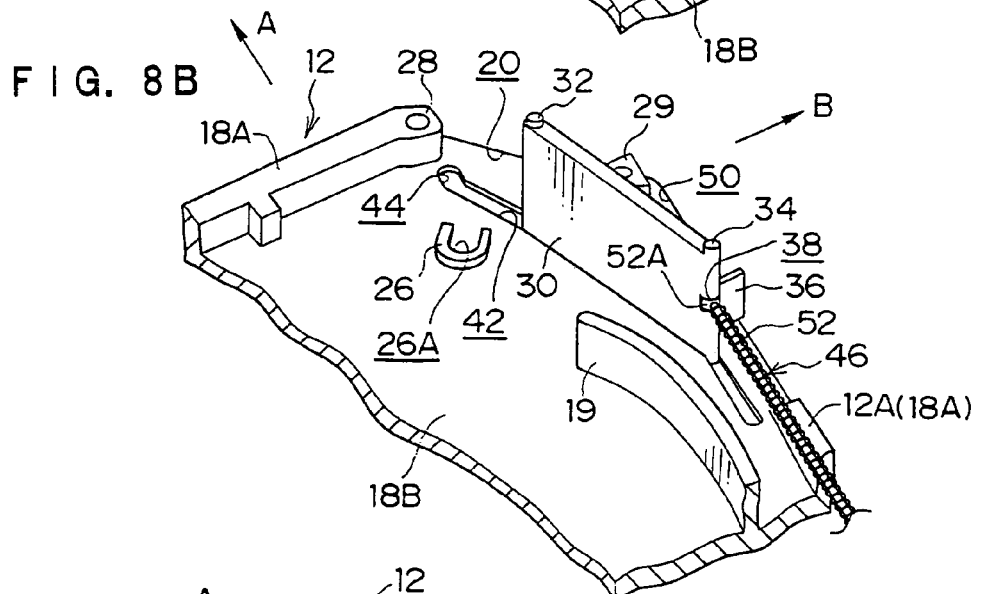
Figure 8C:
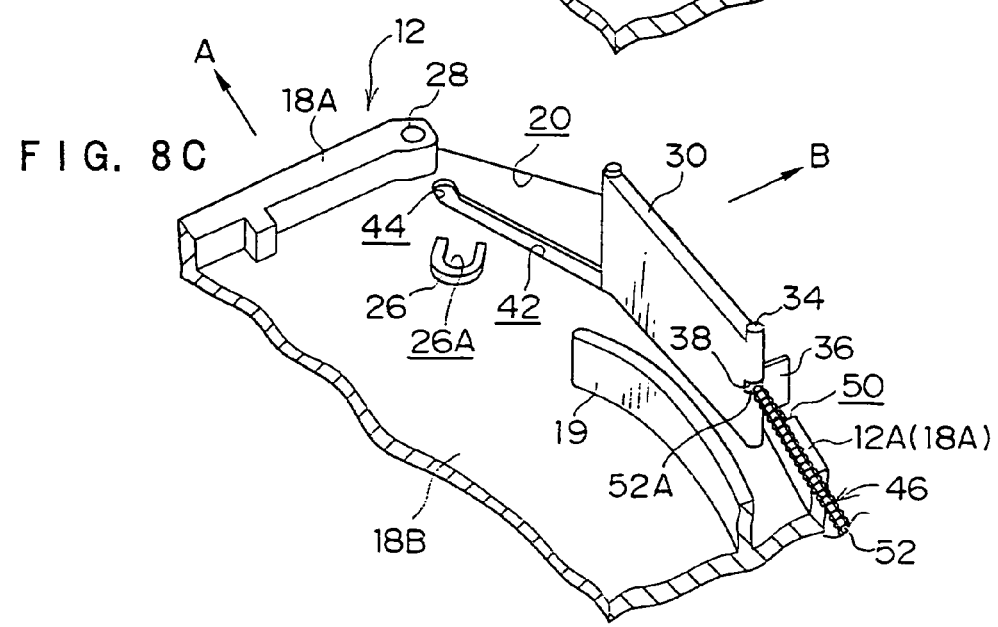

As shown in FIGS. 6 and 8B, the guide pins 32 and 34 of the door 30 are guided by the first and second guide grooves 40 and 42, respectively, and the door 30 moves rearward while turning in the clockwise direction around the guide pin 34 in plan view. The door 30 opens the opening 20 when it is positioned in the open position almost parallel with the right side wall 12A in a state where the each guide pin 32 is positioned at the rear end of the second guide groove 42 and the each guide pin 34 is positioned in the rear end of the first guide groove 40 (refer to FIGS. 7 and 8C).

As shown in FIG. 7, the position of the terminating end of the second guide groove 42 is determined so that an end (the front end on the guide pin 32 side) of the door 30 in the open position does not project forward from a normal line "n" of the open face drawn from the open face (periphery) of the opening 20 so as to be in contact with the screw boss 29. By the arrangement, the door 30 in the open position does not disturb entry of the chucking mechanism 22. The inclination angle from the arrow A direction of the second guide groove 42 is determined by an operational request of the door 30. In the embodiment, the inclination angle of the second guide groove 42 does not coincide with the inclination angle in the arrow A direction of the open face of the opening 20 determined by a functional request as the recognition section. That is, the open face of the opening 20 and the second guide groove 42 are not parallel with each other in the embodiment. Obviously, the open face of the opening 20 and the second guide groove 42 may be parallel with each other as a result.

In the embodiment, the rear end of the second guide groove 42 is disposed on the inner side of the case 12 more than the front end of the first guide groove 40 (to the opposite side in the arrow B direction), thereby preventing the second guide groove 42 from being exposed to the outside in a state where the opening 20 is closed. In other words, the second guide groove 42 is formed on the inner side of the case 12 relative to the door 30 in the close position of the opening 20, so that ducts are not deposited on the inside when the magnetic tape T is not used (when stored or carried). Therefore, the door 30 in the open position is slightly inclined from the right side wall 12A (the arrow A direction).

In addition, to smooth the operation of the door 30, the clearance between the guide pins 32 and 34 and the first and second guide grooves 40 and 42 (width direction) is preferably about 0.05 mm to 0.4 mm on one side (0.1 mm to 0.8 mm on both sides) on assumption that the center lines of them match each other. The clearance is set to, more preferably, 0.2 mm so that the door 30 moves smoothly while preventing rattle of the door 30. The clearance between the upper and lower end faces of the door 30 and the inner face of the case 12 (the top plate 16B and the bottom plate 18B) is, preferably, about 0.05 mm to 0.2 mm on one side.

Further, the front end portion of the second guide 42 is formed as a bent portion 44 which is bent outward of the case 12 from the longitudinal direction of the second guide 42. The bent portion 44 is formed along the arrow A direction. In a state where the opening 20 is closed by the door 30, the guide pin 32 of the door 30 enters the bent portion 44 by a urging force of the compression coil spring 46 which will be described later.

With the configuration, even when the user tries to move the door 30 to the open position in a state where the opening 20 is closed by the door 30, the guide pin 32 is retained by the bent portion 44 (frictional resistance between the guide pin 32 and the bent portion 44 becomes larger than a component of force in the direction of moving the guide pin 32 along the bent portion 44), thereby achieving a simple lock mechanism for preventing the door 30 from being easily opened. Although the bent portion 44 is formed along the arrow A direction in the embodiment, the bent portion 44 can be formed by setting the inclination angle from the longitudinal direction of the second guide groove 42 to an arbitrary value between 50° to 150°. Further, the bent portion 44 can be formed in a curve.

The recording tape cartridge 10 also has the compression coil spring 46 for urging the door 30 to the close position side. The compression coil spring 46 is disposed in a compressed state between the case 12 and the door 30 in a state where a core member 52 for preventing bending (buckling) is inserted.

Concretely, a supporting portion 52A provided at a front end portion of the core member 52 formed in a stick shape is fit in and pivot-connected to the notch 38 in the door 30 so that the door 30 is supported rotatably and swingably along the horizontal plane around the coupled portion (in the direction of moving toward/apart from the right side wall 12A) with respect to the core member 52. On the rear side of the rear end of the first guide groove 40 in the lower-half case 18, the spring bearing 54 is provided so as to be continuous from the inside of the peripheral wall 18A of the right side wall 12A.

The spring bearing 54 has a grove portion 54A which is open near the upper end of the peripheral wall 18A and supports one end of the compression coil spring 46 from below, and a retaining portion 54B provided at the rear end of the groove portion 54A and by which one end (rear end) of the compression coil spring 46 is engaged (retained). The core member 52 can pass the retaining portion 54B such that the retaining portion 54B does not interfere and the retaining portion 54B makes the core member 52 which moves in accordance with movement of the door 30 escape. The upward opening of the retaining portion 54B is closed by a not-shown wall provided for the upper-half case 16. While maintaining the function of making the core member escape, a positional deviation of the core member 52, that is, the compression coil spring 46 is prevented.

In a compressed state, one end (rear end) of the compression coil spring 46 is retained by the spring bearing 54, and the other end (front end) abuts against the supporting portion 52A in the core member 52, coupled to the door 30. In the recording tape cartridge 10, therefore, the door 30 is urged to the close position side by the compression coil spring 46 disposed along the right side wall 12A as described above, and the opening 20 is usually closed. That is, the urging force in an almost arrow A direction by the compression coil spring 46 always acts on the door 30.

The operation projection 36 of the door 30 is exposed from the slit 50 in the case 12. When the door 30 is in the close position, the operation projection 36 is positioned just rearward of the screw boss 29 and its front end is positioned between facing surfaces of the peripheral walls 16A and 18A (in a plate thickness portion) defining an extended portion of the slit 50 and is not projected to the right side of the right side wall 12A (refer to FIGS. 2 and 5).

The operation projection 36 can be engaged with an engagement member 58 from the front side, which is fixed to the drive apparatus and enters from the portion opening forward in the slit 50 (the right side portion of the screw boss 29) in accordance with the operation of loading the recording tape cartridge 10 into the drive apparatus. When the recording tape cartridge 10 is loaded in the drive apparatus, the operation projection 36 moves the door 30 relatively rearward (to the open position side) while being engaged with the engagement member 58. Specifically, while the operation projection 36 engages with the engagement member 58, the case 12 moves to the arrow A direction relative to the drive apparatus (operation projection 58), so that a moving force to the rearward (in the direction almost opposite to the arrow A) acts on the door 30.

Further, as shown in FIG. 1, the door 30 has a slit cover 56 for closing the slit 50 when the door 30 is in the close position. The slit cover 56 is formed in an almost-rectangular thin plate (film) and has, in its front end, a holding hole 56A in which the operation projection 36 is inserted. The slit cover 56 is fixed to the door 30 by adhesion or the like in a state where the operation projection 36 is inserted in the holding hole 56A and is disposed so as to be slidably in contact with the inner face of the right side wall 12A.

When the recording tape cartridge 10 is not in use, the slit 50 is closed by the slit cover 56, thereby preventing invasion of dusts and the like to the inside of the case 12, particularly, to a reel area via a portion around the pin stand 26 in which the idle restricting wall 19 is notched for pulling the magnetic tape T to the outside of the case 12. In the diagrams except for FIG. 1, the slit cover 56 is not shown.

The door 30 described above is formed integrally with the case 12 made of PC by using, for example, polyacetal (polyoxymethylene, POM) resin having excellent wear resistance and a low coefficient of friction. The guide pins 32 and 34 may be formed separately from the body of the door 30. In this case, the guide pins 32 and 34 may be formed of a resin such as polyamide (PA), polytetrafluoroethylene (PTFE), or polyethylene, a metal, or a material containing any of the resins or metal as a main component. On the other hand, the case 12 may be formed of, in place of PC, acrylonitrile-butadiene-styrene (ABS) resin or a metal material. In the case of making the case 12 of a metal material, the guide pins 32 and 34 have to be made of a resin in consideration of the wear characteristic and prevention of abnormal sound.

The operation of the embodiment will now be described.

In the recording tape cartridge 10 having the above-described configuration, when unused (when stored, carried, or the like), the opening 20 is closed from the inside by the door 30. In this state, the guide pin 32 fits in the bent portion 44 of the second guide groove 42 by the urging force of the compression coil spring 46, and the door 30 is locked in a simple manner. Even when the user tries to move the door 30 along the open face of the opening 20, the guide pin 32 fits in the groove wall of the bent portion 44 and the door 30 does not move. Therefore, the opening 20 is maintained in the closed state and is not opened by an intention of the user.

On the other hand, at the time of using the magnetic tape T, the recording tape cartridge 10 is loaded in a bucket (not shown) in the drive apparatus along the arrow A direction. In association with the loading, as shown in FIGS. 5 and 7, the engagement member 58 fixed to the bucket of the dive apparatus comes into engagement with the operation projection 36 of the door 30, thereby giving a force of movement to almost rearward to the door 30. By the movement force, the door 30 is guided by the first and second guide grooves 40 and 42 and, while swinging around the guide pin 34, moves almost rearward. When the door 30 is positioned almost parallel with the right side wall 12A and reaches the open position, the opening 20 is completely opened (enters the state of FIG. 7).

The door 30 is guided by the first and second guide grooves 40 and 42, swings around the guide pin 34 and, while changing its orientation (posture), moves from the close position to the open position so as to pass around the reel 14 and the leader pin 24 (pin stand 26).

When the recording tape cartridge 10 is loaded to a predetermined depth in the bucket, the bucket descends and the recording tape cartridge 10 is accurately positioned in both the vertical and horizontal directions in the drive apparatus. Further, in association with the descent, a drive gear (not shown) of the drive apparatus comes into engagement with the reel gear of the reel 14, and the reel 14 becomes rotatable. From the opened opening 20, the hook 22A of the chucking mechanism 22 enters the case 12 and retains the leader pin 24 positioned and held in the pin stand 26.

The chucking mechanism 22 retaining the leader pin 24 pulls the leader pin 24 from the case 12 and pulls the magnetic tape T from the case 12. Further, the chucking mechanism 22 guides the leader pin 24 to the hub of a not-shown take-up reel while pulling the magnetic tape T along a predetermined tape path and makes the leader pin 24 together with the hook 22A housed in a housing portion of the hub.

By synchronously rotating the reel 14 and the take-up reel in this state, the magnetic tape T is sequentially wound around the hub of the take-up reel and information is recorded or reproduced to/from the magnetic tape T by a recording/reproduction head disposed along the predetermined tape path.

On the other hand, at the time of rewinding the magnetic tape T, the reel 14 and the take-up reel are driven so as to reversely rotate. After the magnetic tape T is rewound up, the chucking mechanism 22 allows the leader pin 24 to be held by the pin stand 26. When the chucking mechanism 22 goes out from the opening 20, the bucket rises, and the recording tape cartridge 10 (case 12) is released from the positioned state.

In this state, the recording tape cartridge 10 is moved in the direction opposite to the arrow A direction by a not-shown eject mechanism or the urging force of the compression coil spring 46. The door 30 returns to the close position of the opening 20 by the urging force of the compression coil spring 46. At the time of return, the door 30 is guided by the first and second guide grooves 40 and 42 and moves almost forward while swinging around the guide pin 34.

As described above, at the time of opening/closing the opening 20, the first and second guide grooves 40 and 42 convert the urging force or movement force whose direction is almost coincide with the arrow A direction or the opposite direction acting on the door 30 into a force of moving the door 30 while changing the orientation of the door 30. While being guided by the first and second guide grooves 40 and 42, the door 30 moves so as to pass around the leader pin 24 and the reel 14 in the case 12, and closes and opens the opening 20 with reliability.

Since the opening 20 is formed by notching the corner on the loading side of the rectangular case 12, the open face is directed to the arrow A direction and the arrow B direction (the open face is inclined from the arrow A direction). In other words, the chucking mechanism 22 of the drive apparatus can access the leader pin 24 from the front face side in the arrow A direction of the case 12 and it is unnecessary to access from the outside (arrow B side) of in the direction of the peripheral walls (side walls) 16A and 18A at the arrow B side. Consequently, in the drive apparatus, the shortest path for pulling the magnetic tape T can be realized. A drive mechanism such that the chucking mechanism 22 comes from the arrow B side of the case 12 becomes unnecessary, and smaller size and lower cost are realized.

Since the door 30 moves between the close position and the open position in the case 12 to close and open the opening 20, the door 30 does not come out from the case 12 in the process of opening/closing the opening 20. The housing space of the recording tape cartridge 10 in the drive apparatus is small. In other words, it is unnecessary to assure (have) the space for opening/closing the door 30 in the drive apparatus. A part (such as a roller for guiding a recording tape) on the drive apparatus can be disposed also in the space in the drive apparatus corresponding to the notch in which the opening 20 is formed of the case 12.

Since the first and second guide grooves 40 and 42 for converting the urging force in the arrow A direction to the force of moving the door 30 while changing the orientation of the door 30 are provided, the function of reliably closing the opening 20 by the door 30 of which orientation is changed according to the opening/closing of the opening 20 is realized by the simple structure of disposing the compression coil spring 46 as urging means of a simple structure along the right side wall 12A of the case 12. Particularly, since the door 30 is guided by the first and second guide grooves 40 and 42 via the guide pins 32 and 34, the function of reliably closing the opening 20 by the door 30 which moves while changing its orientation is realized by the simple structure. The compression coil spring 46 disposed along the right side wall 12A is effectively arranged (laid out) in a relatively small space in the case 12 without projecting to the housing space of the reel 14 and the like in the case 12. In other words, the influence of the compression coil spring 46 is not exerted (or hardly exerted) on the layout of the reel 14. As compared with a configuration using, for example, a plate spring or a helical torsion coil spring, the reel 14 can be disposed more to the front side. Thus, the recording tape cartridge 10 can be designed compactly.

Further, the door 30 moves to the open position as described above when the operation projection 36 comes into engagement with the engagement member 58 in association with loading of the case 12 to the drive apparatus, so that it is sufficient for the engagement member 58 to simply follow the movement in a state where the engagement member 58 abuts against the operation projection 36 of the door 30 of which orientation is changed in the process of opening the opening 20. Thus, the structure of the drive apparatus is simplified. Particularly, in the embodiment, the operation projection 36 of the door 30 is exposed from the slit 50 formed in the right side wall 12A of the case 12 so as to be engaged with the engagement member 58 in association with the loading, and the movement force transmitted from (caused by) the engagement member 58 is converted to the force of movement of the door 30 to the open position while changing the orientation of the door 30 by the first and second guide grooves 40 and 42. Consequently, it is sufficient to simply fix the engagement member 58 in the position where the operation projection 36 can engage with the engagement member 58, so that the structure of the drive apparatus is further simplified.

As described above, in the recording tape cartridge 10 according to the embodiment, while maintaining the function of the door 30 of reliably closing/opening the opening 20, the size of the drive apparatus can be reduced.

When the path for pulling out the magnetic tape T is set to the shortest, the path of the magnetic tape T becomes naturally shorter, so that contact friction between the magnetic tape T and a tape guide (for example, a rotatably supported roller) can be reduced.

Further, the opening 20 faces in the arrow A direction and the arrow B direction, so that the range of the direction of accessing the leader pin 24 of the chucking mechanism 22 (hook 22A) is widened, and the position in which the leader pin 24 can be disposed in the case 12 is widened. Since the locus of operation of the door 30 does not interfere with the realistic position in which the leader pin 24 can be disposed, the position in which the leader 24 can be disposed is not narrowed. Thus, flexibility of designing of the drive apparatus is improved.

Further, the door 30 is a member separate from the leader pin 24 which is pulled from the case 12, the door 30 cannot be detached from the case 12 by the guide pins 32 and 34 and the first and second guide grooves 40 and 42. Consequently, the door 30 is not easily detached from the case 12 due to a shock or the like when the recording tape cartridge 10 is dropped. The leader pin 24 is housed in the case 12 in a sealed state by closing the opening 20 with the door 30 when the magnetic tape T is not used, so that a scratch or damage to the leader pin 24 is suppressed. Therefore, no influence is exerted on pulling or traveling of the magnetic tape T in the drive apparatus, and the magnetic tape T is not damaged.

The pivot coupling portion (notch 38) with the core member 52 on which the urging force of the compression coil spring 46 acts in the door 30 moves on a straight line which is almost parallel with the right side wall 12A (in the arrow A direction) by opening/closing of the opening 20 when the guide pins 34 positioned above and below the portion are guided by the first guide groove 40. Consequently, the compression coil spring 46 provided along the right side wall 12A is not deformed in the direction crossing the axial direction of the compression coil spring 46 or the deformation is suppressed remarkably, and the force in the direction crossing the arrow A direction is prevented from being acted on the door 30. Thus, the operation of the door 30, specifically, the operation of closing/opening the opening 20 is stabilized.

Further, in the recording tape cartridge 10, the core member 52 is inserted in the compression coil spring 46, thereby preventing deformation (buckling) in the direction intersecting the axial line of the compression coil spring 46. Therefore, the force in the direction intersecting the loading direction is reliably prevented from acting on the door 30, and the action of the door 30 is stabilized more. Particularly, the core member 52 is pivot-connected to the door 30 and can swing in the direction of approaching to/apart from the right side wall 12A. The core member 52 is displaced so as to maintain the state in which the core member 52 is along the right side wall 12A together with the compression coil spring 46 so as to follow a change in the orientation of the door 30 accompanying the opening/closing of the opening 20. Consequently, the core member 52 is prevented from disturbing movement of the door 30 accompanying opening/closing of the opening 20 and from giving resistance force. That is, the force in the direction intersecting the arrow A direction is prevented from acting on the door 30 by deformation of the core member 52 or interference with the others, and the action of the door 30 is stabilized more.

Figure 9:
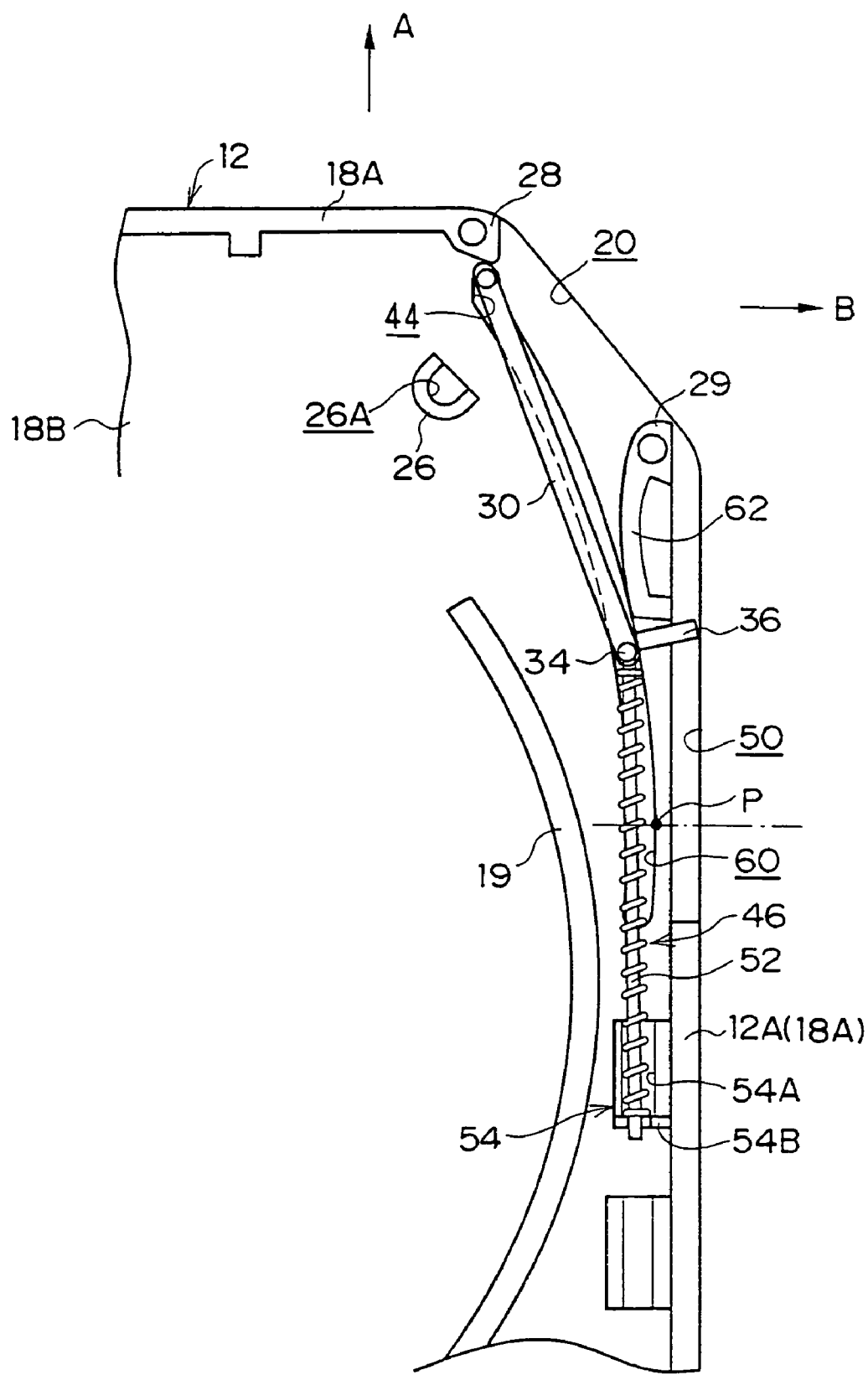
FIG. 9 is a plan view showing, with the upper-half case removed, a state where an opening in a recording tape cartridge according to a modification of the invention is closed by a door.
Figure 10:
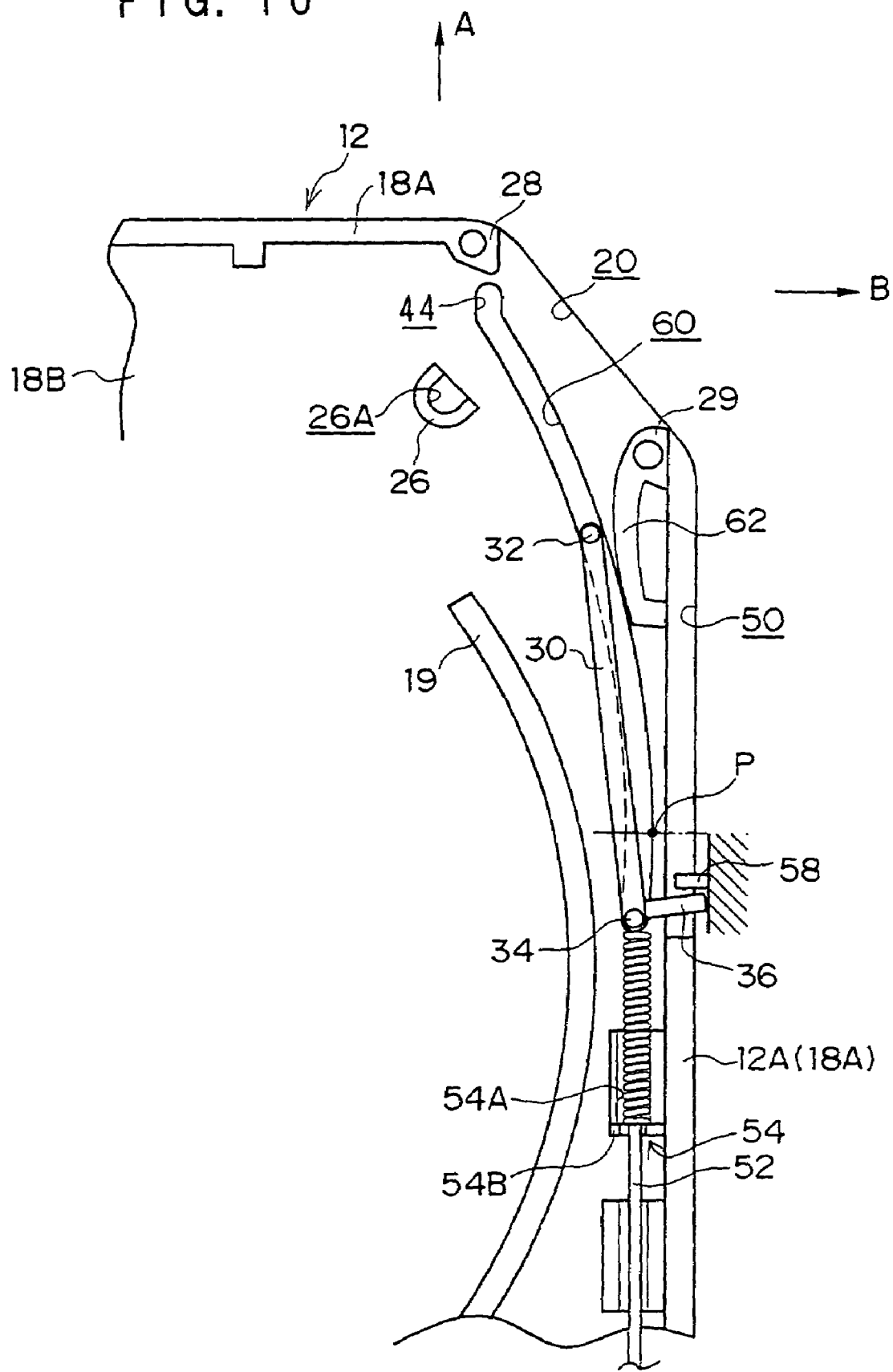
FIG. 10 is a plan view showing, with the upper-half case removed, a state where the opening in the recording tape cartridge according to the modification of the invention is open.
Figure 11:
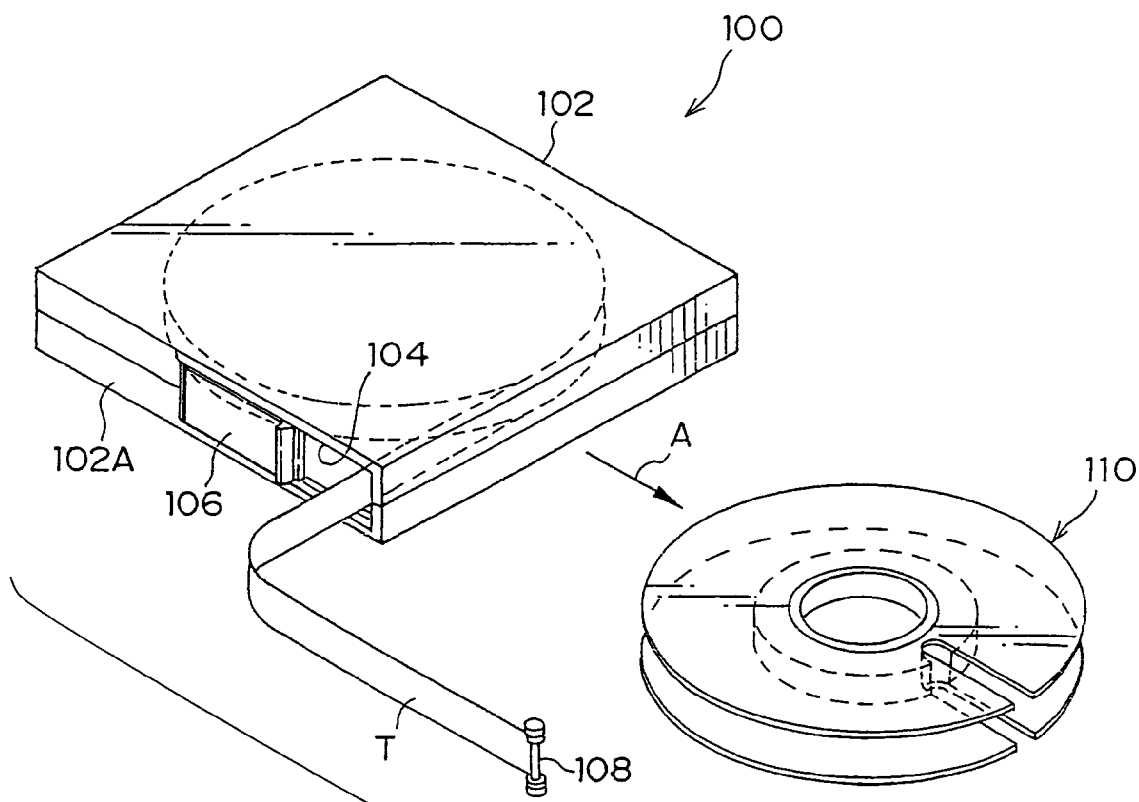
FIG. 11 is a perspective view showing a general configuration of a conventional recording tape cartridge.
Figure 12:
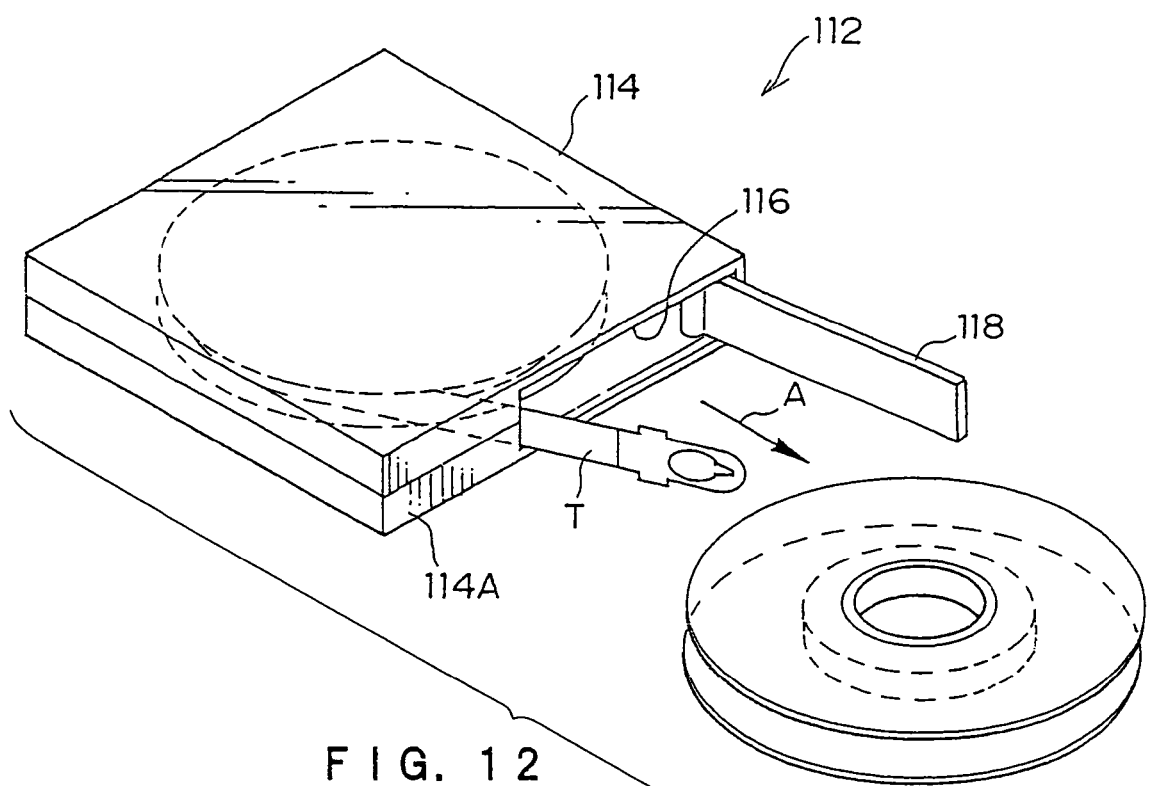
FIG. 12 is a perspective view showing a general configuration of the conventional recording tape cartridge.
Figure 13:
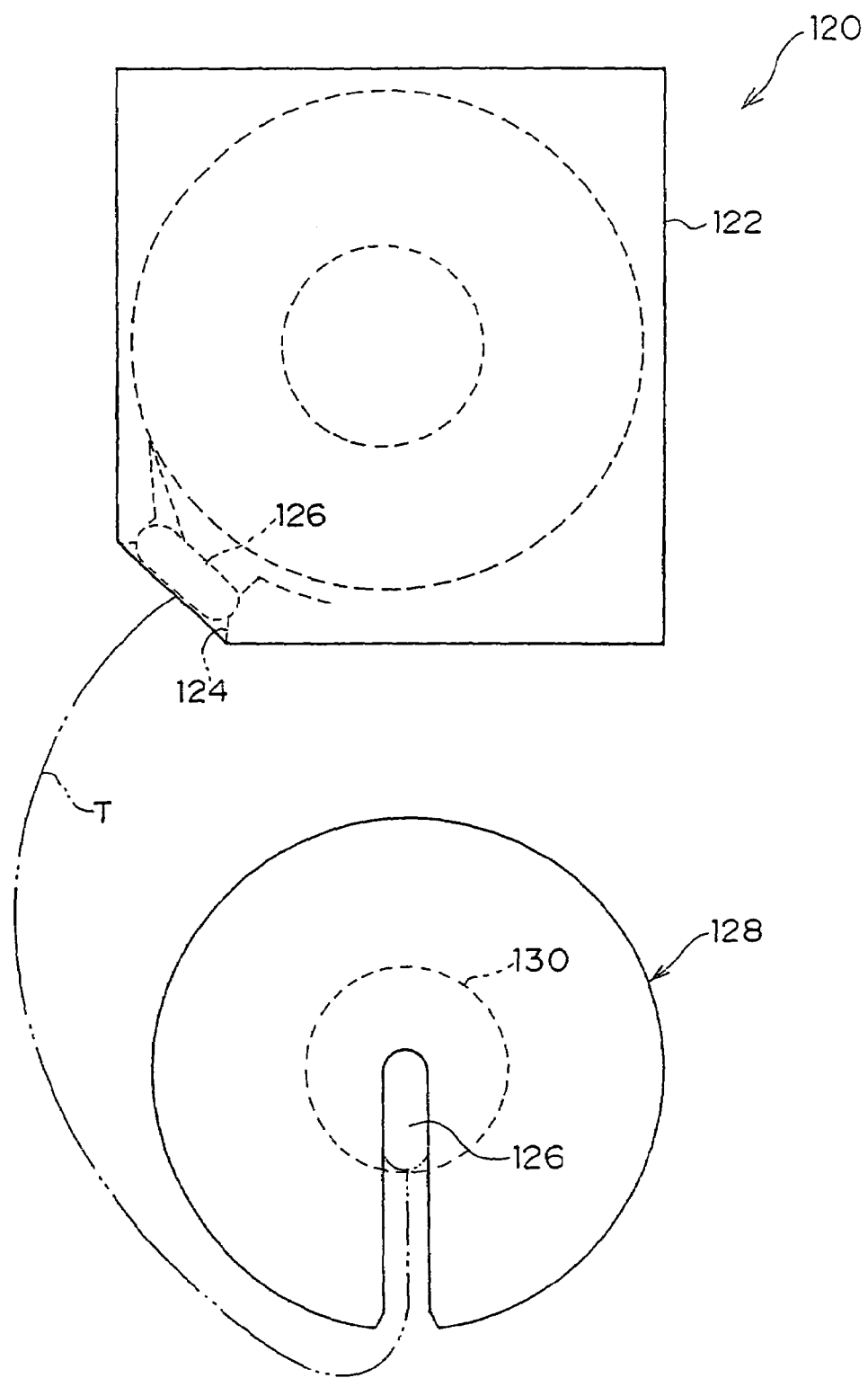
FIG. 13 is a perspective view showing a general configuration of the conventional recording tape cartridge.

Although the first and second guide grooves 40 and 42 are provided as the guide section and the cam reel in the embodiment, the invention is not limited to the configuration. For example, a configuration of a modification shown in FIGS. 9 and 10 may be employed. The modification will be described hereinbelow. The same reference numerals as those of the foregoing embodiment are given to components and parts which are the basically same as those in the foregoing embodiment and their description will not be repeated.

In the configuration of the modification, in place of the pair of upper and lower first and second guide grooves 40 and 42, a pair of upper and lower circular-arc guide grooves 60 as the guide portion or cam rail are provided. Each of the circular-arc guide grooves 60 extending from the bent portion 44 as a start point extends between the screw bosses 28 and 29 in the case 12 and the pin stand 26, passes the point P which is on the front side of the rear end of the slit 50 and is closest to the right side wall 12A, and ends at the left side near the rear end of the slit 50. That is, the circular-arc guide groove 60 is formed in a circular arc shape which is curved outward in the case 12 in plan view.

By the upper and lower circular-arc guide grooves 60, both of the guide pins 32 and 34 inserted are guided along the longitudinal direction. In the configuration, in a state where the guide pin 32 is positioned at the front end of the circular-arc guide groove 60 and the guide pin 34 is positioned in an intermediate portion of the circular-arc guide groove 60, one end of the door 30 abuts against the screw boss 28, the other end is positioned near an inner wall 62 continued from the screw boss 29, and the opening 20 is closed from the inside by the door 30 (refer to FIG. 9). The inner wall 62 is constructed by joining a pair of upper and lower inner walls, provided almost in parallel with the right side wall 12A, and continued to the right side wall 12A so that the rear end is positioned just in front of the operation projection 36 of the door 30 in the close position.

The guide pins 32 and 34 of the door 30 are guided by the circular-arc guide grooves 60 and the door 30 is moved rearward while being rotated (revolved) around the center of the circular arc. In a state where the guide pin 32 is positioned in an intermediate portion of the circular-arc guide groove 60 and the guide pin 34 is positioned in the rear end of the guide groove 60, the door 30 is positioned in the open position almost parallel with the right side wall 12A and opens the opening 20 (refer to FIG. 10).

In the configuration of the modification, the travel locus of the rear end of the door 30, that is, the pivot-coupled portion with the core member 52 on which the urging force of the compression coil spring 46 acts is not straight but passes the point P (the maximum value in the right direction of the travel locus of the door 30) which is the closest to the right side wall 12A in the circular-arc guide groove 60 each time the opening 20 is closed/open. In other words, passing the point P having a tangent parallel with the arrow A direction, so that a displacement in the left-right direction accompanying opening/closing of the opening 20 is suppressed. Thus, deformation in the direction intersecting the axial line of the compression coil spring 46 which urges the door 30 is suppressed, and the force in the direction intersecting the arrow A direction is prevented from acting on the door 30. It makes the operation of the door 30 stable. The other effects of the configuration of the modification are similar to those of the foregoing embodiment.

In the foregoing embodiment and modification, the first and second guide grooves 40 and 42 or the circular-arc guide grooves 60 as the guide section or cam rail for guiding the door 30 are provided. However, the invention is not limited to the configuration. For example, in place of each of the guide grooves, a rib (wall) continuously or intermittently upright from the top plate 16B or the bottom plate 18B may be provided. The guide is not limited to the configuration that it is fit in the guide pins 32 and 34 to guide the door 30. For example, the guide may engage with the front end or rear end of the door 30 to guide the door 30. In those cases, the travel path (locus) of the door 30 for closing the opening 20 and that for opening the opening 20 may be different from each other.

Further, the foregoing embodiment and modification employ the preferable configuration that the core member 52 is inserted in the compression coil spring 46. However, the invention is not limited to the configuration. For example, the core member 52 may not be provided. In place of the core member 52, a tubular member for covering the compression coil spring 46 from the outside to prevent (check) bending may be provided. The core member 52 is not always necessary to be pivot-coupled to the door 30. For example, the core member 52 may be fixed to the case 12 and inserted to the notch 38 in the door 30, so that it does not interfere with the travel of the door 30.

In addition, in the foregoing embodiment and modification, the operation projection 36 of the door 30 is exposed from the slit 50 formed in the right side wall 12A. However, the invention is not limited to the configuration. For example, the operation projection 36 may be provided on the outside of the front end of the door 30, an engagement member supported by the drive apparatus so as to be swingable in the horizontal direction swingably engages with the operation projection 36, and the engagement state is maintained in the process of opening the opening 20. In the configuration, the slit 50 and the slit cover 56 is not necessary. Further, for example, the operation projection 38 may be exposed from a slit or the like formed in the bottom plate 18B.

Although the slit 50 is provided in the intermediate portion in the vertical direction of the right side wall 12A in the foregoing embodiment and modification, the invention is not limited to the configuration. For example, the slit 50 may be formed in the circumferential wall 16A or 18A as a component of the right side wall 12A or in the bottom plate 18B. To assure smooth action of the door 30, it is desirable that the height of the slit 50 (the operation projection 36 on which the movement force acts) and that of the compression coil spring 46 for giving the urging force (in the case of providing a plurality of the compression coil springs 46, an average height) coincide each other.

Further, although the leader pin 24 is provided as a leader member in the foregoing embodiment and modification, the invention is not limited to the configuration. It is sufficient that the leader member is a member separate from the door 30 and is housed in the case 12 of which opening 20 is closed by the door 30 when the magnetic tape T is not used, and any shape or a pulling out structure by the drive apparatus may be employed.

Although the magnetic tape T is used as a recording tape in the foregoing embodiment and modification, the invention is not limited to the magnetic tape T. Any recording tape may be used as long as it is grasped as a long-tape-shape information recording/reproducing medium to/from which recording information can be recorded/reproduced. Obviously, the recording tape cartridge of the invention can be applied to recording tapes of any recording/reproduction systems.

As described above, the recording tape cartridge according to the invention has excellent effects such that can contribute to reduction in the size of the drive apparatus while maintaining the function of reliably opening/closing the opening by the shielding member.

What is claimed is:

1. A recording tape cartridge comprising:
    a substantially rectangular-shaped case in which a single reel around which a recording tape is wound is rotatably accommodated;
    an opening which is formed by notching a corner, on a front side in a direction of loading the case into a drive apparatus, of the case and from which a leader member attached at an end of the recording tape is pulled out;
    a shielding member having a flat plate shape, which is provided in the case and can be selectively positioned between a close position in which the shielding member is inclined from the loading direction to close the opening and an open position in which the shielding member is disposed substantially along a side wall parallel to the loading direction in the case to open the opening;
    a compression coil spring disposed along the side wall and applying an urging force to the shielding member toward the close position;
    an operation portion provided at the shielding member, which comes into engagement with an engagement member of the drive apparatus by an operation of loading of the case to the drive apparatus, thereby applying a moving force to the shielding member toward the open position; and
    a guide provided at the case, which guides the shielding member so that the shielding member travels between the close position and the open position while changing orientation thereof by the urging force or the moving force.

2. A recording tape cartridge according to claim 1, wherein the guide takes form of a cam rail which engages with a guide projection projected from an end portion of the shielding member.

3. A recording tape cartridge according to claim 2, wherein the cam rail is formed so that a travel locus of a portion in the shielding member, on which the urging force of the compression coil spring acts, draws one of a straight line which is almost parallel with the side wall or a circular arc passing a point closest to the side wall.

4. A recording tape cartridge according to claim 1, further comprising a core member which is inserted into the compression coil spring to thereby prevent deformation of the compression coil spring in a direction intersecting an axial line of the compression coil spring.

5. A recording tape cartridge according to claim 4, wherein the core member is swingably coupled to a portion in the shielding member, on which the urging force of the compression coil spring acts.

6. A recording tape cartridge according to claim 1, wherein the operation portion is exposed from a window portion provided in the side wall so as to be engaged with the engagement member, wherein the operation portion projects through the window portion.

7. A recording tape cartridge according to claim 1, wherein the guide comprises a first guide and a second guide, and a first guide projection projected from one end portion of the shielding member and a second guide projection projected from the other end portion of the shielding member are respectively engaged with the first guide and the second guide.

8. A recording tape cartridge according to claim 7, wherein the first guide is arranged in the case such that the first guide is along the side wall parallel to the loading direction, and the second guide is arranged in the case such that a longitudinal direction of the second guide is inclined with respect to the loading direction.

9. A recording tape cartridge according to claim 8, wherein a rear end portion of the second guide is disposed at inner side of the case with respect to a front end portion of the first guide.

10. A recording tape cartridge according to claim 7, wherein the second guide has a bent portion at a front side in the loading direction thereof.

11. A recording tape cartridge according to claim 1, wherein the guide has a substantially circular arc configuration which is curved outward of the case.

12. A recording tape cartridge according to claim 11, wherein the guide has a bent portion at a front side in the loading direction thereof.

13. A recording tape cartridge according to claim 11, wherein a first guide projection projected from an one end portion of the shielding member and a second guide projection projected from the other end portion of the shielding member are engaged with the guide.

14. A recording tape cartridge comprising:
a substantially rectangular-shaped case in which a single reel around which a recording tape is wound is rotatably accommodated;
an opening which is formed by notching a corner, on a front side in a direction of loading the case into a drive apparatus, of the case and from which a leader member attached at an end of the recording tape is pulled out;
a shielding member having a flat plate shape, which is provided in the case and can be selectively positioned between a close position in which the shielding member is inclined from the loading direction to close the opening and an open position in which the shielding member is disposed substantially along a side wall parallel to the loading direction in the case to open the opening;
a compression coil spring disposed along the side wall and applying an urging force to the shielding member toward the close position;
an operation portion provided at the shielding member, which comes into engagement with an engagement member of the drive apparatus by an operation of loading of the case to the drive apparatus, thereby applying a moving force to the shielding member toward the open position;
a guide provided at the case, which guides the shielding member so that the shielding member travels between the close position and the open position while changing orientation thereof by the urging force or the moving force; and
a core member which is inserted into the compression coil spring to thereby prevent deformation of the compression coil spring in a direction intersecting an axial line of the compression coil spring;
wherein the core member is swingably coupled to a portion in the shielding member, on which the urging force of the compression coil spring acts.

15. A recording tape cartridge comprising:
a substantially rectangular-shaped case in which a single reel around which a recording tape is wound is rotatably accommodated;
an opening which is formed by notching a corner, on a front side in a direction of loading the case into a drive apparatus, of the case and from which a leader member attached at an end of the recording tape is pulled out;
a shielding member having a flat plate shape, which is provided in the case and can be selectively positioned between a close position in which the shielding member is inclined from the loading direction to close the opening and an open position in which the shielding member is disposed substantially along a side wall parallel to the loading direction in the case to open the opening;
a compression coil spring disposed along the side wall and applying an urging force to the shielding member toward the close position;
an operation portion provided at the shielding member, which comes into engagement with an engagement member of the drive apparatus by an operation of loading of the case to the drive apparatus, thereby applying a moving force to the shielding member toward the open position;
a guide provided at the case, which guides the shielding member so that the shielding member travels between the close position and the open position while changing orientation thereof by the urging force or the moving force; and
a core member which is inserted into the compression coil spring to thereby prevent deformation of the compression coil spring in a direction intersecting an axial line of the compression coil spring;
wherein the core member is swingably coupled to a portion in the shielding member, on which the urging force of the compression coil spring acts, and a direction of the core member and a direction of the compression coil spring into which the core member is inserted, do not change while a direction of the shielding member is changed due to the shielding member moving.

16. A recording tape cartridge comprising:
a substantially rectangular-shaped case in which a single reel around which a recording tape is wound is rotatably accommodated;
an opening which is formed by notching a corner, on a front side in a direction of loading the case into a drive apparatus, of the case and from which a leader member attached at an end of the recording tape is pulled out;

a shielding member having a flat plate shape, which is provided in the case and can be selectively positioned between a close position in which the shielding member is inclined from the loading direction to close the opening and an open position in which the shielding member is disposed substantially along a side wall parallel to the loading direction in the case to open the opening;

a compression coil spring disposed along the side wall and applying an urging force to the shielding member toward the close position;

an operation portion provided at the shielding member, which comes into engagement with an engagement member of the drive apparatus by an operation of loading of the case to the drive apparatus, thereby applying a moving force to the shielding member toward the open position; and a guide provided at the case, which guides the shielding member so that the shielding member travels between the close position and the open position while changing orientation thereof by the urging force or the moving force;

wherein the operation portion is exposed from a window portion provided in the side wall so as to be engaged with the engagement member, and wherein the operation portion projects through the window portion.

* * * * *